United States Patent Office 2,802,021
Patented Aug. 6, 1957

2,802,021

HYDRAZINOPROPIONITRILE COMPOUNDS

Samuel Allen Heininger, Dayton, Ohio, assignor to Monsanto Chemical Company, St. Louis, Mo., a corporation of Delaware No Drawing. Application January 27, 1956,
Serial No. 561,939

3 Claims. (Cl. 260—465.5)

This invention relates to new hydrazinopropionitrile compounds, and more particularly to new 3-(2-alkylidenehydrazino)-propionitriles having herbicidal properties and to a method of preparation thereof.

In accordance with the present invention, a hydrazone is reacted with acrylonitrile to produce the present novel compounds, as illustrated by the following equation

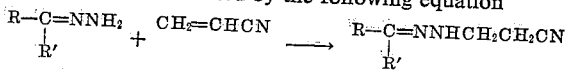

where R is a lower alkyl radical and R' is selected from the class consisting of hydrogen and lower alkyl radicals.

The hydrazones used in preparing the new compounds provided by this invention are readily available materials, prepared by the reaction of hydrazine with an oxo compound, i. e., an aldehyde or ketone. Ketone hydrazones, wherein R and R' of the above formula are both alkyl radicals, the same or different, are formed directly and rapidly on contacting a ketone with hydrazine. Aldehyde hydrazones, wherein R' in the above formula is hydrogen, are usually prepared by reaction of an aldehyde with excess hydrazine. Examples of the hydrazones employed for the preparation of the present hydrazinopropionitrile compounds are, for example, ketone hydrazones such as acetone hydrazone, 3-pentanone hydrazone, butyrone hydrazone, 5-nonanone hydrazone, 6-undecanone hydrazone, 2-butanone hydrazone, 2-pentanone hydrazone, 2-hexanone hydrazone, 3-hexanone hydrazone, 3-methyl-4-heptanone hydrazone, 2,4-dimethyl-3-pentanone hydrazone, 2,2,4,4-tetramethyl-3-pentanone hydrazone, 2,2,6,6-tetramethyl-4-heptanone hydrazone, 2-heptanone hydrazone, etc. Aldehyde hydrazones which may be reacted with acrylonitrile in accordance with the present invention include acetaldehyde hydrazone, propionaldehyde hydrazone, butyraldehyde hydrazone, valeraldehyde hydrazone, and caproaldehyde hydrazone.

The new compounds afforded by this invention are 3-(2-alkylidenehydrazino)propionitriles. Examples of such compounds derived from symmetrical ketone hydrazones are 3-(2-isopropylidenehydrazino)propionitrile, 3-[2-(1-ethylpropylidene)-hydrazino]propionitrile, 3-[2-(1-propylbutylidene)hydrazino]-propionitrile, 3-[2-(1-butylamylidene)hydrazino]propionitrile, and 3-[2-(1-amylhexylidene)hydrazino]propionitrile. From asymmetrical ketone hydrazones and acrylonitrile, novel compounds available by the process of the invention are, for example, 3-[2-(1-methylpropylidene)hydrazino]propionitrile, 3-[2-(1-methylbutylidene)hydrazino]propionitrile, 3-[2-(1-methylamylidene)hydrazino]propionitrile, 3-[2-(1-ethylbutylidene)hydrazino]propionitrile, 3-[2-(1-isopropylamylidene)hydrazino]propionitrile, 3-[2-(1-isopropylpropylidene)hydrazino]propionitrile, etc. Aldehyde hydrazones reacted with acrylonitrile in accordance with the present process give, e. g., 3-(2-ethylidenehydrazino)-propionitrile, 3-(2-propylidenehydrazino)propionitrile, 3-(2-butylidenehydrazino)propionitrile, 3-[2-(2-methylbutylidene)-hydrazino]propionitrile, etc.

The process embodying this invention comprises contacting acrylonitrile with the hydrazone of a lower alkyl oxo compound until addition is complete. The proportions of the reactants are not critical, although in general approximately stoichiometric proportions will be used as a matter of efficiency and economy. Advantageously, large excesses of acrylonitrile are avoided to obviate the possibility of side reactions, such as polymerization. The addition reaction may be conducted in the presence or absence of extraneous solvents or diluents which are inert under the reaction conditions employed, i .e., are free of reactive hydrogen. Representative solvents of this type are, for example, benzene, hexane, dioxane, etc. If desired, the reaction may be accelerated by the application of heat, e. g., the reaction mixture may be stirred at temperatures of from room temperature to the reflux temperature of the mixture. While catalysts are not necessary for the present reaction to take place, if desired, the process may be carried out in the presence of a catalyst, to accelerate the reaction rate. Preferred are alkaline catalysts, organic or inorganic, such as alkali metal hydroxides, e. g., sodium or potassium hydroxide, basic salts thereof, e. g., magnesium or lithium carbonate, or quaternary ammonium organic compounds. The present hydrazinepropionitrile compounds may be prepared under any practical pressure conditions, either sub-atmospheric or super-atmospheric; however, for most purposes atmospheric pressure conditions are adequate.

The present novel compounds are stable, well defined, generally viscous liquids, useful for a variety of agricultural and industrial purposes. Thus, for example, the propionitrile compounds derived from aldehyde hydrazones may be added to oils to increase the stability and useful life thereof. Ketone hydrazone derivatives prepared in accordance with this invention may be reduced to the corresponding saturated hydrazino compounds, which are of potential utility as blowing agents for polymeric materials. The present hydrazines are also biological toxicants and may be used, for example, as insecticides, nematocides, fungicides, bactericides, etc. They are particularly active as herbicides.

The invention is illustrated but not limited by the following examples.

*Example 1*

A 72.1 gram portion (1.0 mole) of acetone hydrazone was placed in a 200 ml. flask provided with magnetic stirrer, thermometer and dropping funnel. The hydrazone was stirred while 53.1 grams (1.0 mole) of acrylonitrile was added dropwise and the mixture heated to 40–45° C. The addition required one-half hour. The reaction mixture was then stirred and refluxed for 24 hours. At the end of this time, the reflux temperature had risen to about 150° C. The reaction mixture was fractionated, giving 51 grams of a liquid, b. 123–127°/23 mm., $n_D^{23}$ 1.4687. Infra-red analysis of this liquid indicated the presence of NH and absence of $NH_2$ groups, and the liquid was further identified as 3-(2-isopropylidenehydrazino)propionitrile by the following analysis:

|  | Found | Calcd. for $C_6H_{11}N_3$ |
|---|---|---|
| Percent C | 56.78 | 57.36 |
| Percent H | 8.94 | 8.86 |
| Percent N | 32.67 | 33.58 |

*Example 2*

Employing the procedure of Example 1, but replacing the acetone hydrazone by one mole of isobutyraldehyde hydrazone, there is obtained 3-(2-isobutylidenehydrazino)propionitrile.

The alkylidenehydrazinopropionitriles prepared as described above are biological toxicants. Thus, for example, the isopropylidenehydrazinopropionitrile of Example 1 is toxic to nematodes of the species *Panagrellus redivivus* at concentrations of 0.01 percent and above. It is also a preemergent and foliage application herbicide. Thus, for example, the germination of cucumber seeds planted in ground previously treated with a rate equal to 25 lbs. per acre of 3-(2-isopropylidenehydrazino)propionitrile was severely suppressed and the cucumber plants failed to emerge. Concentrations as low as 0.005 percent, sprayed as an emulsion on young grasses of the genus Triticum as a post-emergent application, produced injury to the grasses.

The present compounds will usually be applied as herbicides by diluting the active ingredient in a carrier. The solid propionitrile compounds may be mixed with an inert powdered carrier such as talc, bentonite, etc. and applied to soils or plants as a dust. Emulsions are another useful formulation for the convenient application of the present herbicidal materials to soils and vegetation. In preparing emulsions of the present compounds, for example, the alkylidenehydrazinopropionitrile is dissolved in a water immiscible solvent, mixed with an emulsifying agent, such as a long chain alkylbenzene sulfonate or polyalkylene glycol, and diluted with water to make a solution of the desired concentration. The amount of herbicidally active compound in the compositions as applied will vary with the active ingredients, the manner of application, the weeds which it is sought to destroy, etc.

While the invention has been described with particular reference to various preferred embodiments thereof, it will be appreciated that numerous modifications and variations are possible without departure from the invention.

What is claimed is:

1. 3-(2-alkylidenehydrazino)propionitriles of the formula.

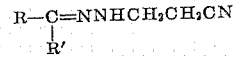

where R is a lower alkyl radical and R' is selected from the class consisting of lower alkyl radicals and hydrogen.

2. 3-(2-alkylidenehydrazino)propionitriles of the formula

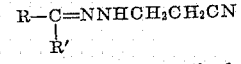

where R and R' are lower alkyl radicals.

3. 3-(2-isopropylidenehydrazino)propionitrile.

References Cited in the file of this patent

UNITED STATES PATENTS

| | | |
|---|---|---|
| 1,992,615 | Hoffmann et al. | Feb. 26, 1935 |
| 2,469,358 | Alderson et al. | May 10, 1949 |
| 2,579,580 | Howk et al. | Dec. 25, 1951 |